AC POWER SOURCE 3,513,309
PIEZOELECTRIC UNITARY DEVICE FOR EMIT-
TING FLUORESCENCE AND AMPLIFYING RA-
DIATION UNDER STIMULATION IN OPPOSITE
DIRECTIONS
Günter O. Hehemann, Starnberg, Germany (% Michael
Wahl, 42 W. 88th St., New York, N.Y. 10024)
Filed Jan. 29, 1968, Ser. No. 701,816
Int. Cl. G01n 29/00
U.S. Cl. 250—71          25 Claims

ABSTRACT OF THE DISCLOSURE

A piezoelectric unitary device for emitting fluorescence and amplifying radiation comprises a transparent piezoelectric crystal doped with ions of atoms heterogeneous to those of the crystal lattice. A piezo driving body is adjacent and forms a single unitary body with the crystal. The driving body is mechanically coupled to the crystal and applies mechanical pressure to the crystal to provide a direct piezoelectric effect. The piezo axis of the driving body is oriented relative to that of the crystal to provide in the crystal a converse piezoelectric effect. The direct piezoelectric effect and the converse piezoelectric effect are opposed to and work against each other in the crystal. Alternating current is supplied to the crystal and to the driving body.

DESCRIPTION OF THE INVENTION

The present invention relates to a luminescence emitter and radiation amplifier. More particularly, the invention relates to a piezoelectric unitary device for emitting fluorescence and amplifying radiation under stimulation in opposite directions and serving as a light source as well as a structural light amplifier.

Different methods of inducing a transparent crystal to luminesce are known in the art. However, the known methods, such as, for example, triboluminescence or crystal luminescence, deliver only a minimum quantity of light, or they function to pump the crystal with X-rays or ultraviolet light, thereby reducing the frequency of the pumping light to a lower value, visible to the human eye. This is a complicated and quantitatively ineffective procedure which is worthless for industrial and other practical purposes.

Contrary to the known methods, the present invention, for the first time, permits as much electric energy as desired or as delivered by a high frequency generator or a source of alternating current in general, to be supplied to the crystal. The invention utilizes a new physical effect which involves permitting the so called converse piezoelectric effect to work against the so called direct piezoelectric effect in an appropriate piezoelectric crystal which is accordingly doped.

The direct piezoelectric effect is well known in the art as the physical effect resulting whenever an anisotropic crystal without a centrum of symmetry has pressure applied to it in a certain direction relative to its axes, usually the so called X-axis, as in quartz. The crystal constringes or constricts in the direction of the pressure applied and dilates in one of the directions at right angles to the X-axis. In quartz, the right angled direction is the so called Y-axis. The two crystal planes at right angles on the X-axis are thereby electrically charged, one positively, and the other negatively.

The aforedescribed phenomenon is thought to be the result of the shifting of the positive against the negative electric charge centers in the lattice, since a piezoelectric crystal is always formed of ionic compounds of two or more chemical elements constituting so called dipoles. In a quartz crystal, for example, the positively charged silicon ion centers in the lattice move a minimum distance towards one crystal plane, while the negatively charged oxygen ion centers move towards the opposite plane.

Similarly, in the so called converse piezoelectric effect, when a negative electrode is applied to the corresponding plane of the crystal and a positive electrode is applied to the opposite plane, thereby forming an electric field in the dielectric crystal, the positive ion centers are attracted by the negative electrode and the negative ion centers are attracted by the positive electrode. The piezoelectric crystal then constringes in one direction and dilates in the other direction of its X- and Y-axes, as if it were subjected to corresponding mechanical pressure.

It would therefore be possible to set the piezoelectric crystal under mechanical pressure and, at the same time, apply an electric field, both working in the normal piezoelectric sense. The result, however, would be only that one piezoelectric effect assists the other to constringe the crystal in one direction and to dilate it in the other direction. Contrary to this, the principle underlying the invention is to permit the direct and the converse piezoelectric effect to work against each other. The molecular effects in the piezoelectric crystal are as follows. If a piezoelectric crystal like quartz has pressure applied to it in the direction of its so called X-axis, and at the same time two electrodes are applied in the opposite, antipolarizing sense of the piezoelectric effect, wherein the positive electrode is applied to the crystal plane in which the positive charge appears, according to the direct piezoelectric effect, and the negative electrode is applied to the crystal plane in which the negative charge normally appears, the electric charge centers are urged back again, one to the other, although the crystal is deformed by mechanical pressure. The shifting of the charge centers in the piezoelectric crystal is thereby suppressed and results in the electric charge dissipating itself in the molecular system of the lattice.

In a pure, dope-free piezoelectric crystal, the electrical energy supplied to the lattice in this manner, however, would not be sufficient to cause visible effects. Only when the piezoelectric crystal is doped, as is a ruby in a laser device, with 3+-valued ions of neodymium or chromium, does the crystal begin to luminesce. The crystal luminesces in a considerably more intense way than heretofore known, so that said crystal may be technically used as a light source emitting only the light band of neodymium or chromium. If a nearly continuous band of light is desired, such as, for example, for general lighting purposes, as delivered by an electric lamp, the crystal must accordingly be previously doped with two or more heterogeneous ions such as neodymium or chromium.

According to quantum mechanics, the further theory of operation is as follows. The neodymium or chromium ions built into the lattice of the piezoelectric crystal, having lost three electrons, tend to balance the lost electric charge. In a way, these ions form the concentration nuclei for the electric energy supplied to the piezoelectric crystal. The outer electrons of the ions are thus brought to a higher level of energy, and in falling back they emit a band of radiation specific to them.

The system of the present invention may, of course, function if only the current supplied to the electrodes alternates. Since electrons brought to a higher level of energy remain there for about $10^{-8}$ second before falling back, a frequency of $10^8$ to $10^{12}$ Hz. seems advisable. However, there is no apparent reason why the system of the invention should not work also at frequencies much lower than that, even at the frequency of a household light circuit, which is between 50 and 60 Hz. It is also to be understood that the doped piezoelectric crystal in its piezoelectrically induced mechanical force, has to be weaker, and therefore smaller, than the piezoelectric body compressing it.

In accordance with the present invention, the piezoelectric crystal is compressed by a second, greater and stronger, piezoelectric body, preferably also a piezoelectric crystal which, of course, is not doped in any manner. The dope-free crystal serves only as the driving mechanism for the doped crystal. Henceforth, herein, the dope-free crystal is designated as the piezo driving body, since it does not necessarily consist of crystal material, but may consist of piezo ceramic material such as barium titanate. The piezo driving body may also comprise a magnetostrictive transducer of the type used in the lower ranges of ultrasonics.

For a most effective piezo mechanical coupling of the piezo driving body to the doped piezoelectric crystal, said crystal is preferably surrounded by the piezo driving body. The piezo driving body is thus formed, for example, somewhat similarly to a millstone, with the doped piezoelectric crystal seated in the shaft hole. Only the necessary electrodes are provided between the piezoelectric crystal and the piezo driving body. To obtain a most effective or close coupling, the piezo driving body may be thermodynamically shrunk onto the doped piezoelectric crystal, or said doped crystal may be fitted into a hole in the piezo driving body, so that said piezo driving body fits on said doped crystal like a shrunk-on ring.

Alternatively, the doped piezoelectric crystal may be grown in the piezo driving body or said piezo driving body may be grown on the doped piezoelectric crystal. This is accomplished by utilizing a piezo driving body which comprises a material insoluble in the breeding solution, as a quartz body is in water. The appropriate form of a quartz body, such as, for example, a quartz ring, is physically suspended in the solution. The solution comprises, for example, ammoniumdihydrogenphosphate with an addition of a soluble compound of neodymium, both in a water solution. The seed crystal is positioned in the axial or central hole through the quartz ring and is permitted to grow there until it reaches the inner electrodes or the inner surface of the quartz ring and is completely grown in. The seed crystals are then appropriately cut and are positioned around a piezoelectric crystal which is insoluble in water, such as quartz, so that the seed crytals grow inwards, positioned at a distance from the doped piezo crystal which corresponds to the radius of the piezo driving body. The piezo driving bodies, such as, for example, Rochelle salt, grow on the seed crystals until they contact the electrodes or the respective outer surface of the doped piezoelectric crystal and have it grown in. If the grown crystal is soluble in the breeding solution it may be prevented from dissolving by coating it with a thin insoluble layer of protective material before it is suspended in the solution.

The outer electrodes are then affixed to the appropriate parts of the piezo driving body, and if a high frequency generator is connected to the combined system of a doped piezoelectric crystal and a piezo driving body, which in the aforedescribed example is also a crystal body, it is ready to function by emitting radiation corresponding to the light band or bands of the ions with which the piezoelectric crystal is doped.

The features of this invention which I believe to be novel are set forth with particularity in the appended claims. The invention itself, however, both for its organization and method of operation, together with further objects and advantages thereof, may best be understood by reference to the following description taken in conjunction with the accompanying drawings, in which:

Figure 19:
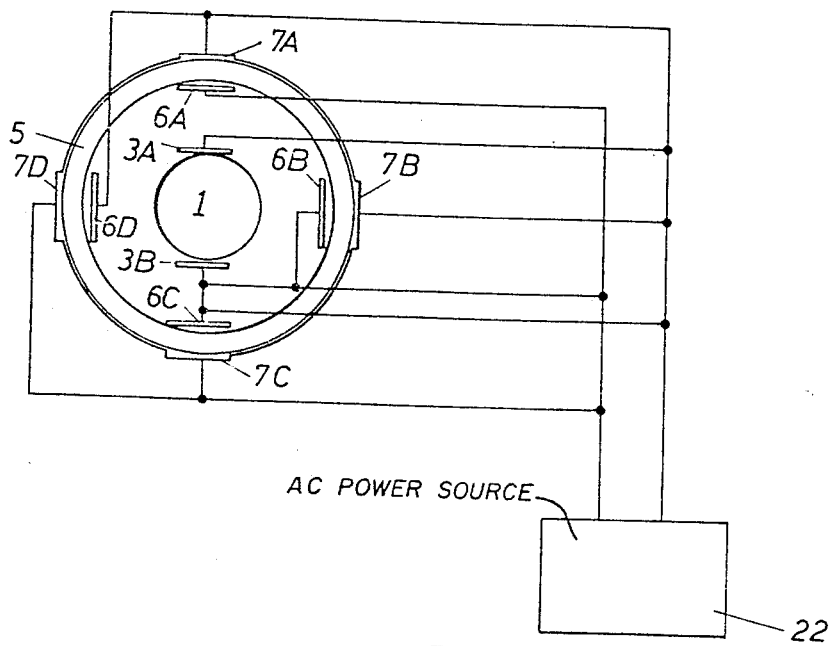
Figure 20:
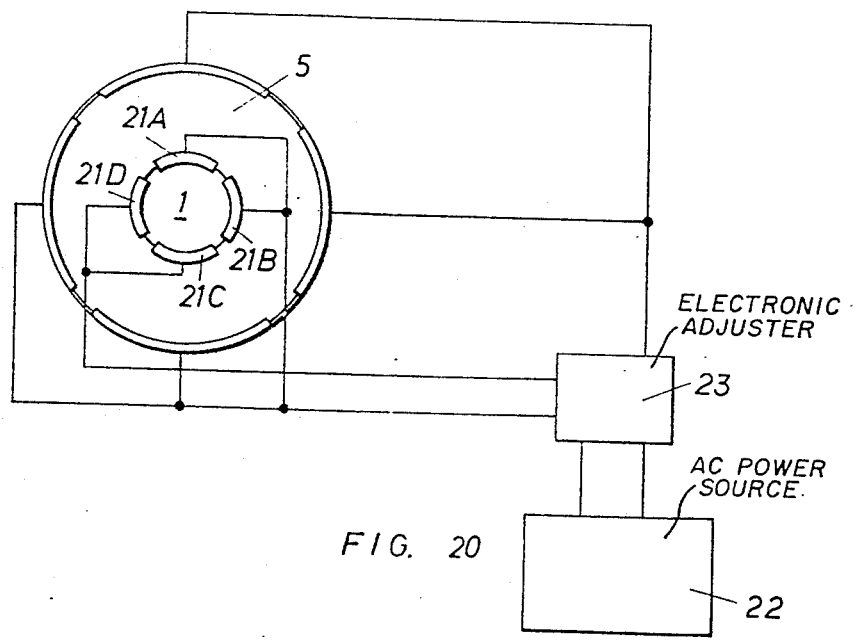

FIG. 19 is a circuit diagram for the piezoelectric crystal and the piezo driving body of the present invention, orientated with their crystal axes in identical directions; and FIG. 20 is a circuit diagram for the piezoelectric crystal and the piezo driving body of the present invention with their piezoelectric axes directed against each other, utilized with an electronic adjustor which automatically adjusts the two electric fields to a relation in which the radiation or other efficiency of the piezoelectric unitary device of the present invention is a maximum.

Figure 1A:
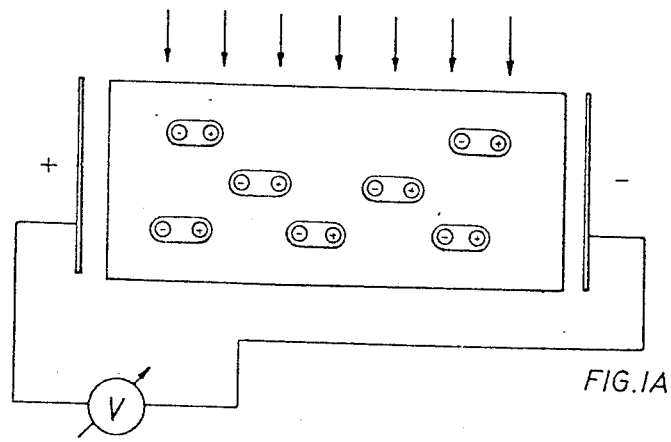
FIGS. 1A, 1B and 1C are schematic illustrations for explaining the opposite piezoelectric effect of the present invention.
Figure 1B:
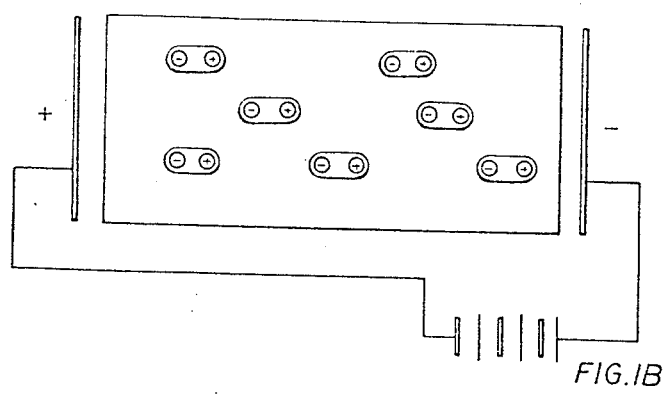
Figure 1C:
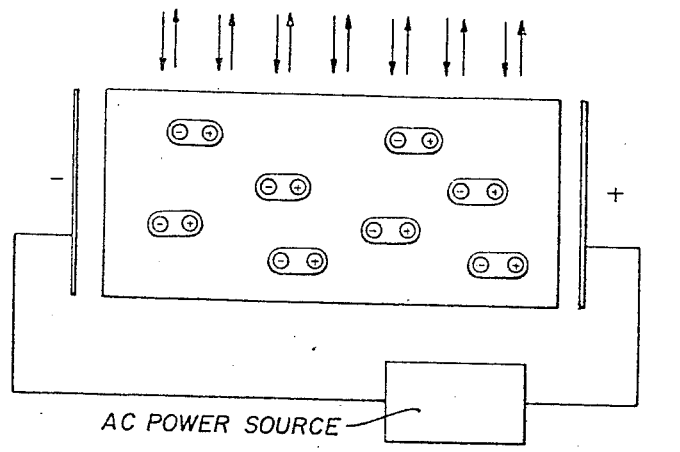

FIG. 1A illustrates the direct piezoelectric effect. FIG. 1B illustrates the converse piezoelectric effect. FIG. 1C illustrates the opposite piezoelectric effect.

Figure 2:
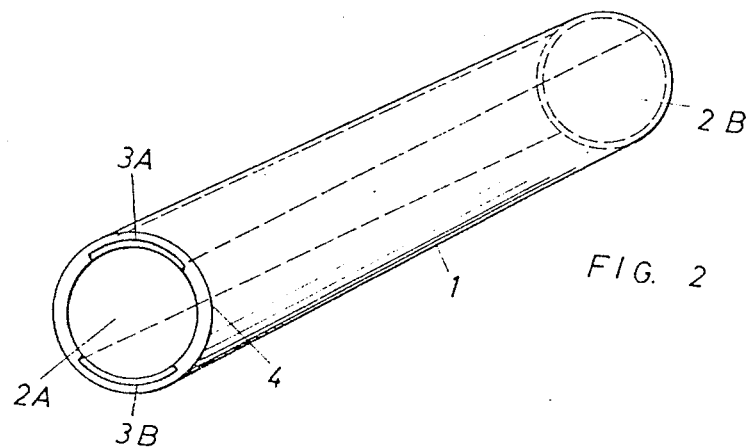
FIG. 2 is a perspective view of the doped rod-shaped piezoelectric crystal of the present invention with the electrodes on its outer surface.

In FIG. 2, a rod-shaped piezoelectric crystal has two ends 2A and 2B which are parallel to each other and are ground to planar configuration to a high degree. The piezoelectric crystal 1 is doped with 0.02 to 0.2 percent neodymium, chromium or other laser active ions, but is otherwise of great purity. Electrodes 3A and 3B are provided on the outer surface of the crystal 1. The electrodes 3A and 3B and the whole crystal surface are covered with a dielectric layer 4 of electrical insulation. The layer 4 may comprise hard, but elastic material, such as, for example, mica. The dielectric layer 4 is only necessary if the piezo axes of the piezoelectric crystal 1 and of the piezo driving body (not shown in FIG. 2) are to be positioned in the piezoelectric unitary device of the invention in identical orientation.

Figure 3:
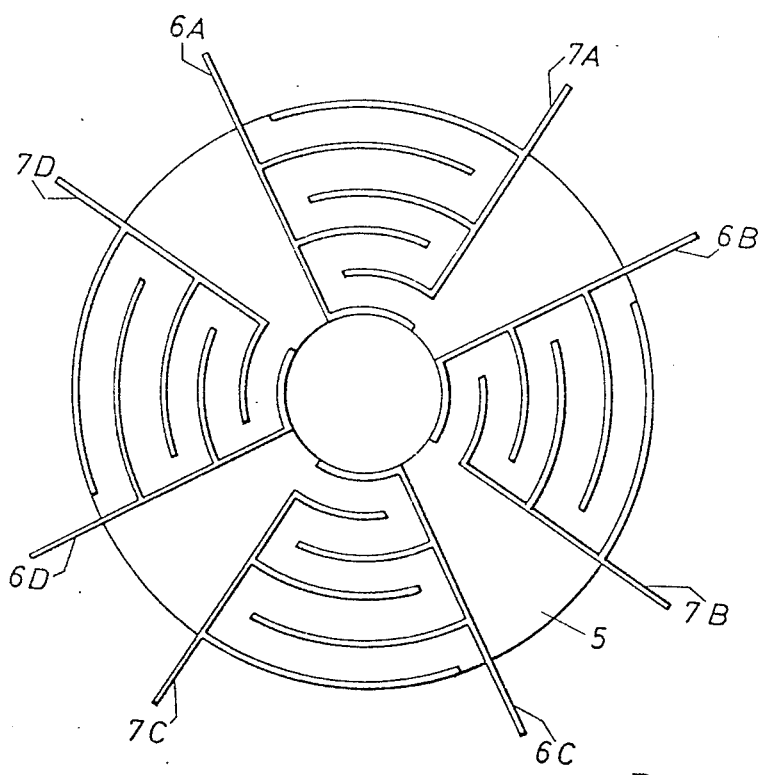
FIG. 3 is a perspective view of the piezo driving body of the present invention, which may comprise either a piezoelectric crystal or a body of radially polarized piezo ceramic material with additional electrodes embedded in the ceramic material while still unsintered.

FIG. 3 shows a piezoelectric or piezo driving body 5 of the present invention. The piezo driving body 5 may comprise polarized piezo ceramics, chemically consisting of 96 percent barium titanate and 4 percent lead titanate. The lead titanate is added to increase the piezoelectric efficiency of the piezo ceramic body. One set of electrodes 6A, 6B, 6C and 6D is provided on the inner surface of the piezo driving body 5. Another set of contrary electrodes 7A, 7B, 7C and 7D is provided on the outer surface of the piezo driving body 5. Both sets of electrodes are embedded in the ceramic material itself to permit a lower voltage in accordance with the laws of piezoelectric physics, as known.

Figure 4:
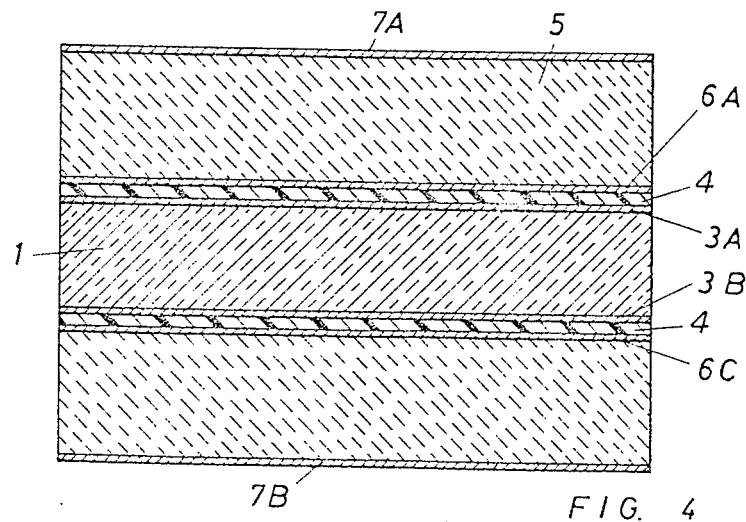
FIG. 4 is a cross-section of the piezoelectric crystal and the piezo driving body of the present invention united to form a unitary combined device by shrinking one onto or into the other.
Figure 5:
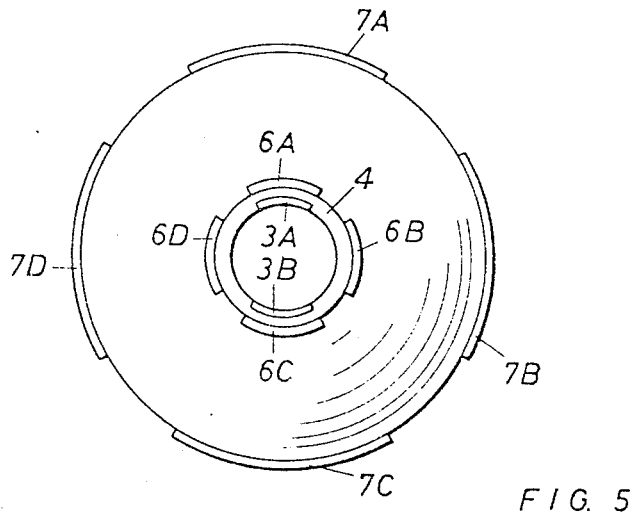
FIG. 5 is a front view of the piezoelectric unitary device of FIG. 4 with the outer electrodes on the outer surface of the piezo driving body.

In FIG. 4, the piezoelectric crystal 1 of FIG. 2, including its electrodes 3A and 3B and its covering dielectric layer 4, is united or combined with the piezo driving body 5 of FIG. 3. The inner electrodes 6A, 6C of the piezo driving body 5 are in position over the electrodes 3A, 3B of the crystal 1. The crystal 1 is thermodynamically seated in the piezo driving body 5. FIG. 5 is a front view of the piezoelectric unitary device of FIG. 4.

Figure 6:
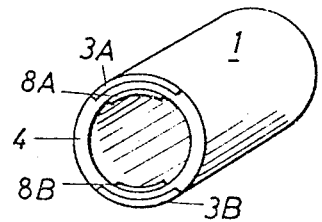
FIG. 6 is a perspective view of a ring-formed piezoelectric crystal of the present invention.

In FIG. 6, the piezoelectric crystal 1 is hollow and formed like a ring. This permits an increase in the relative piezoelectric pressure applied by the piezo driving body 5, directed against the counterpressure of the piezoelectric crystal 1. An additional set of electrodes 8A and 8B is provided on its inner surface.

Figure 7:
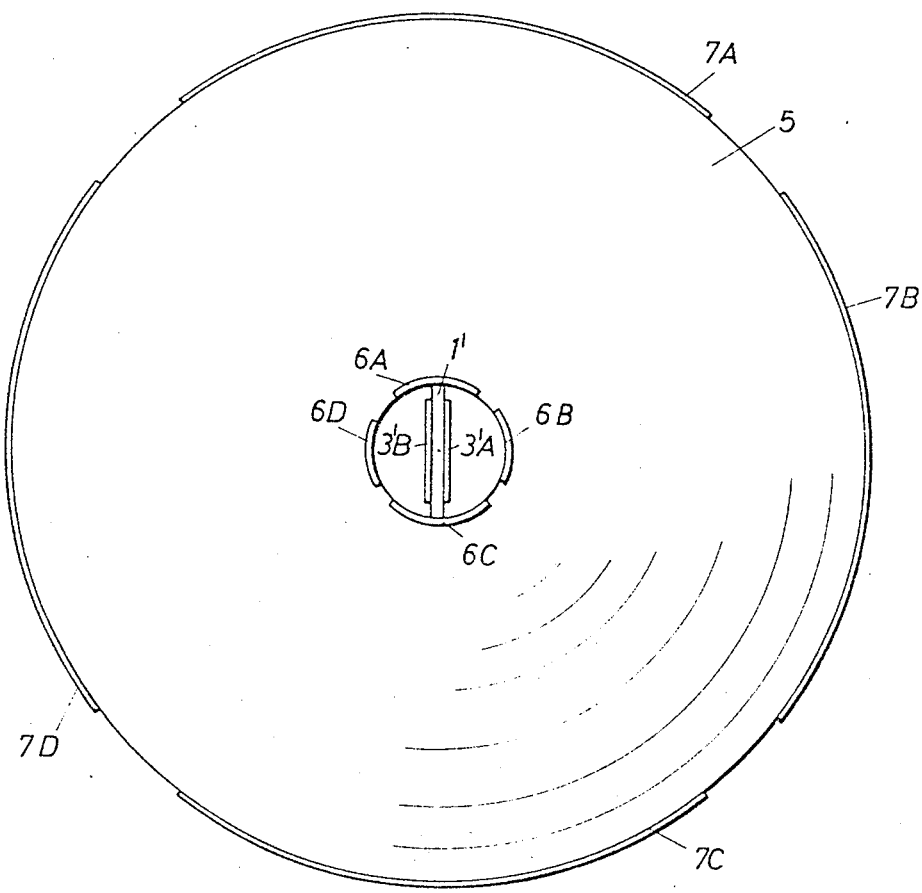
FIG. 7 is a front view of a relatively very small rod-shaped piezoelectric crystal seated in the piezo driving body of the present invention.

In FIG. 7, the piezoelectric crystal 1' is formed as a relatively small rod-shaped piezoelectric crystal body having a rectangular cross-section. The electrodes 3'A and 3'B are provided on the wider planes of the crystal 1' and said crystal is seated in the piezo driving body 5.

Figure 8:
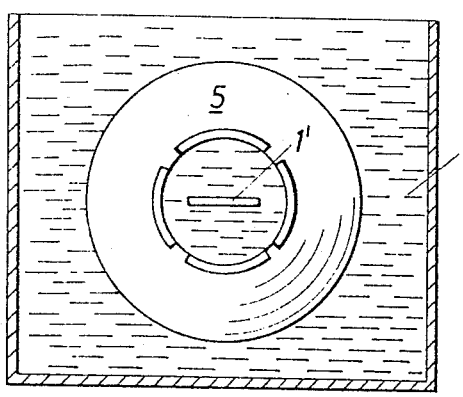
FIG. 8 is a schematic diagram illustrating the growing of a doped piezoelectric crystal in a complete or grown piezoelectric driving body in accordance with the present invention.

FIG. 8 illustrates the growing of a doped piezoelectric crystal 1' in a complete or grown piezo driving body 5. The crystal 1' and the piezo driving body 5 are both suspended in a solution 9, of ammonium-dihydrogenphosphate and neodymium oxide in a mixture relative to the molar weight, as known in the art.

Figure 9:
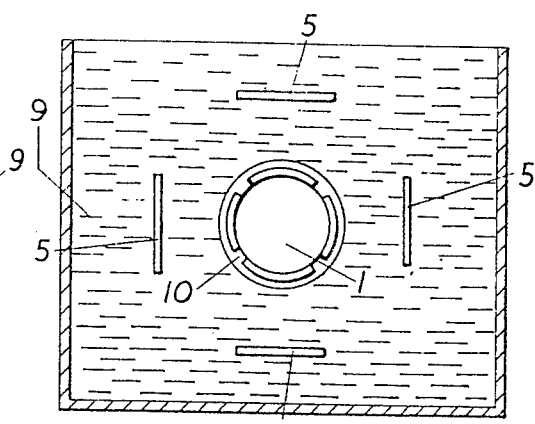
FIG. 9 is a schematic diagram illustrating the growing of a piezo driving body on a grown piezoelectric crystal protected by a thin protective coating from dissolving in solution, in accordance with the present invention.

FIG. 9 illustrates the growing of the piezo driving body 5 on a grown doped piezoelectric crystal 1. If the piezoelectric crystal 1 is soluble in the solution 9 for the piezo driving body 5, said crystal is protected by a thin protective coating 10 which prevents it from dissolving in said solution. The protective coating 10 may comprise for example, a thin layer of lacquer or varnish.

In determining the number of electrodes to be provided with the piezoelectric crystal 1, it always has to be taken into consideration, as known to those skilled in the art, that only one axial direction in a piezoelectric crystal and its counter direction are electrically active, while due to the constriction in one direction and the simultaneous dilation in the direction perpendicular to the aforementioned directions due to pressure, the crystal is mechanically active in two directions. Therefore, only two electrodes are sometimes necessary. Piezo ceramic transducers are known, however, in which axial directions are piezoelectrically active, as disclosed in West German Pats. No. 1,192,705 and No. 1,154,529. Such transducers are utilizable as the piezo driving body 5 of the invention. Naturally, there is also the possibility that the piezoelectric crystal be composed of more than one part, preferably four parts, so that two piezo axial directions may be electrically utilized, as in the art.

Figure 10:
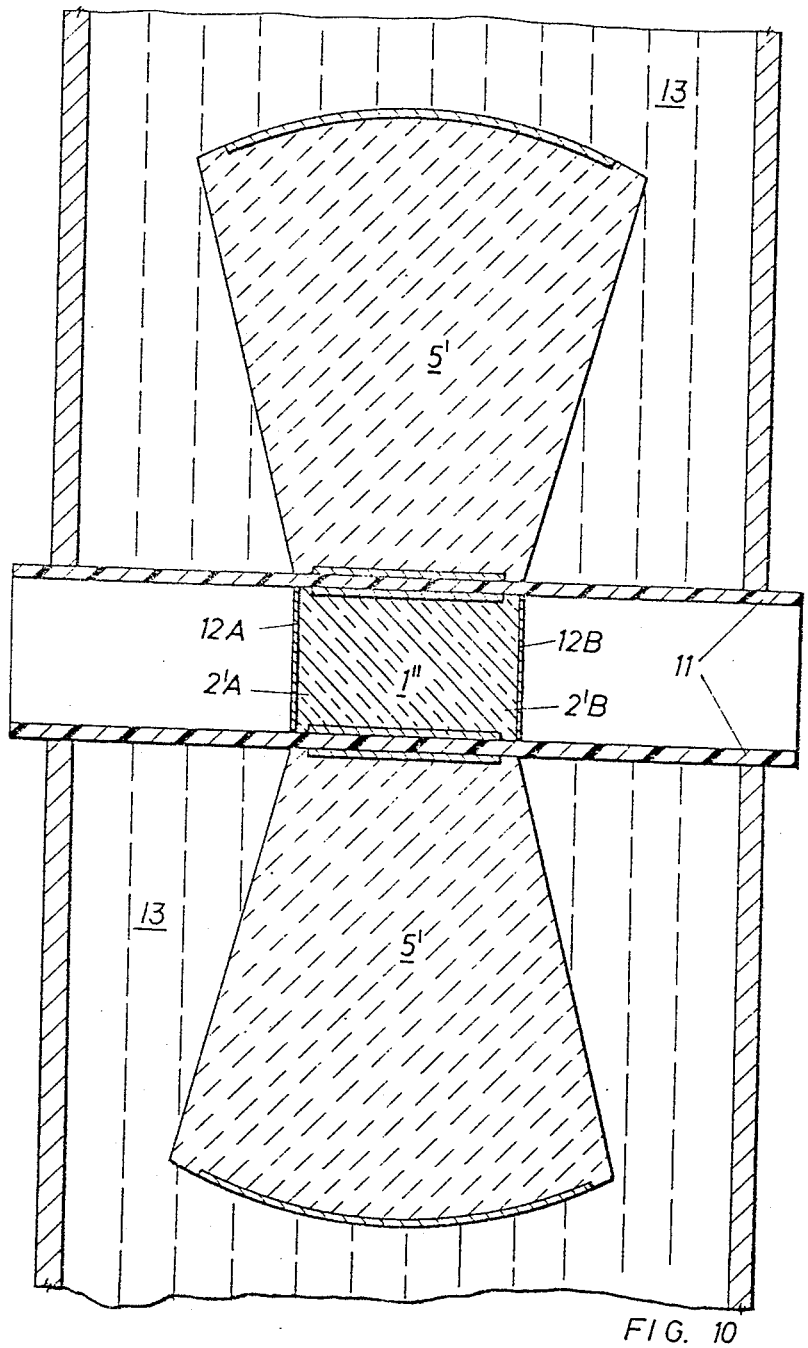
FIG. 10 is a cross-section of a system for cooling the piezoelectric unitary device of the present invention in operation, while it radiates at maximum intensity as for laser purposes.

If the doped piezoelectric crystal 1" is positioned in an extremely high voltage field, as may be necessary in laser technology, a cooling system may be provided for both said crystal and the piezo driving body 5', as shown in FIG. 10. In FIG. 10, the doped piezoelectric crystal 1" is seated or shrunk in an elongated tube 11. Two reflective layers 12A and 12B at the ends 2'A and 2'B of the rod-shaped piezoelectric crystal 1" are also seated or fitted into the tube 11. The cooling system 13 may comprise any suitable cooling system and prevents the crystal 1" from passing its so-called Curie point. The Curie point is at a different temperature for each specific single crystal material and causes a crystal to lose its piezoelectric effectiveness.

Figure 11:
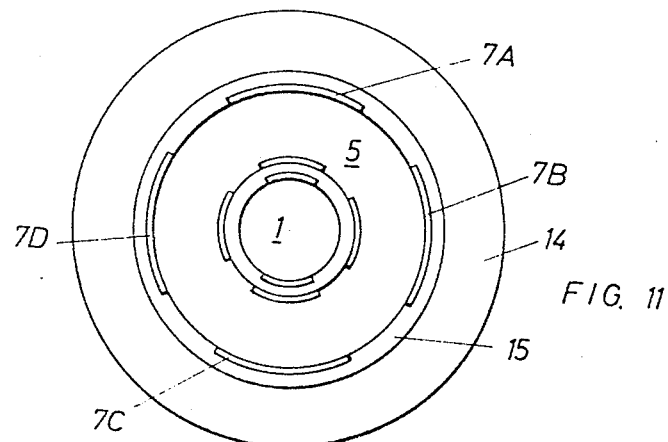
FIG. 11 is a front view of the piezo driving body of the present invention enclosed in a rigid housing which comprises dielectric isolating material at its inner surface.

FIG. 11 shows the piezo driving body 5 enclosed in a rigid housing 14 such as, for example, Invar steel. The housing 14 prevents the piezo driving body 5 from dilating in radial directions away from the axis of the unitary device. The doped crystal 1 is coaxially positioned in the piezo driving body 5 so that the pressure force of said piezo driving body 5 on said crystal 1 is concentrated. The housing 14 is provided at least at its inner surface with a dielectric layer 15 to prevent a short-circuit between the outer electrodes 7A, 7B, 7C and 7D of the piezo driving body 5 and said housing.

Figure 12:
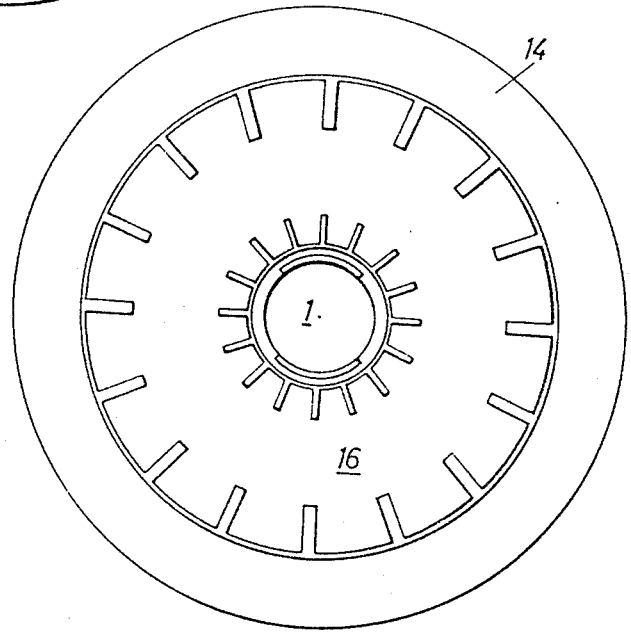
FIG. 12 is a front view of a doped piezoelectric crystal of the present invention enclosed in a magnetostrictive transducer.

In FIG. 12, the doped piezoelectric crystal 1 is enclosed in a magnetostrictive transducer 16 instead of a piezo driving body. The arrangement of FIG. 12, though more-complicated, provides a greater luminescent efficiency with certain doped piezoelectric crystals, depending upon the piezoelectric constants of such crystals, as known in the art.

Figure 13:
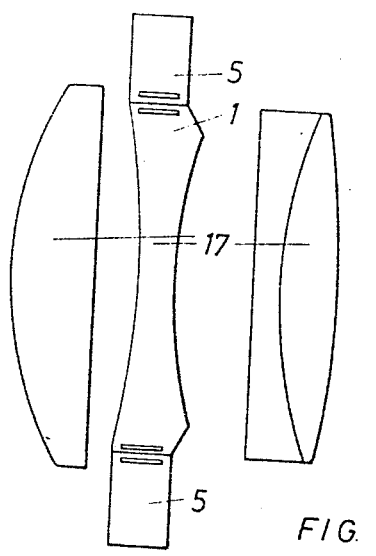
FIG. 13 is a schematic diagram of a doped piezoelectric crystal of the present invention included as part of an optical lens system.

FIG. 13 shows the piezolelectric crystal 1 included in an optical lens system 17, such as, for example, for photographic purposes. For piezoelectric and mechanical reasons relating to the concentration of pressure, the doped piezolelectric crystal 1 preferably replaces a concave ground component of the lens system 17.

Figure 14:
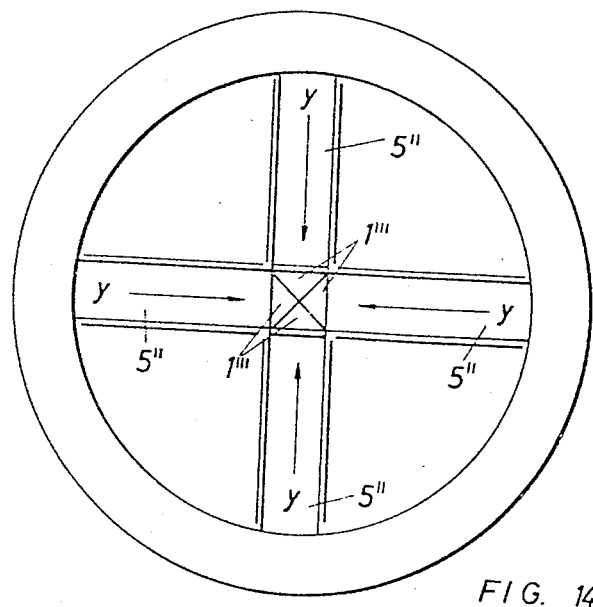
FIG. 14 is a schematic diagram of the piezoelectric crystal and the piezo driving body of the present invention, each comprising more than one part and forming a piezoelectric unitary device of the invention.

In FIG. 14, each of the piezoelectric crystal 1''' and the piezo driving body 5'' comprises more than one part. This permits the piezoelectric crystal 1''', as hereinbefore explained, to function piezoelectrically in two directions, one toward the other, at right angles. The piezo driving body 5'' is divided into parts primarily to increase its piezoelectric mechanical force.

Figure 15:
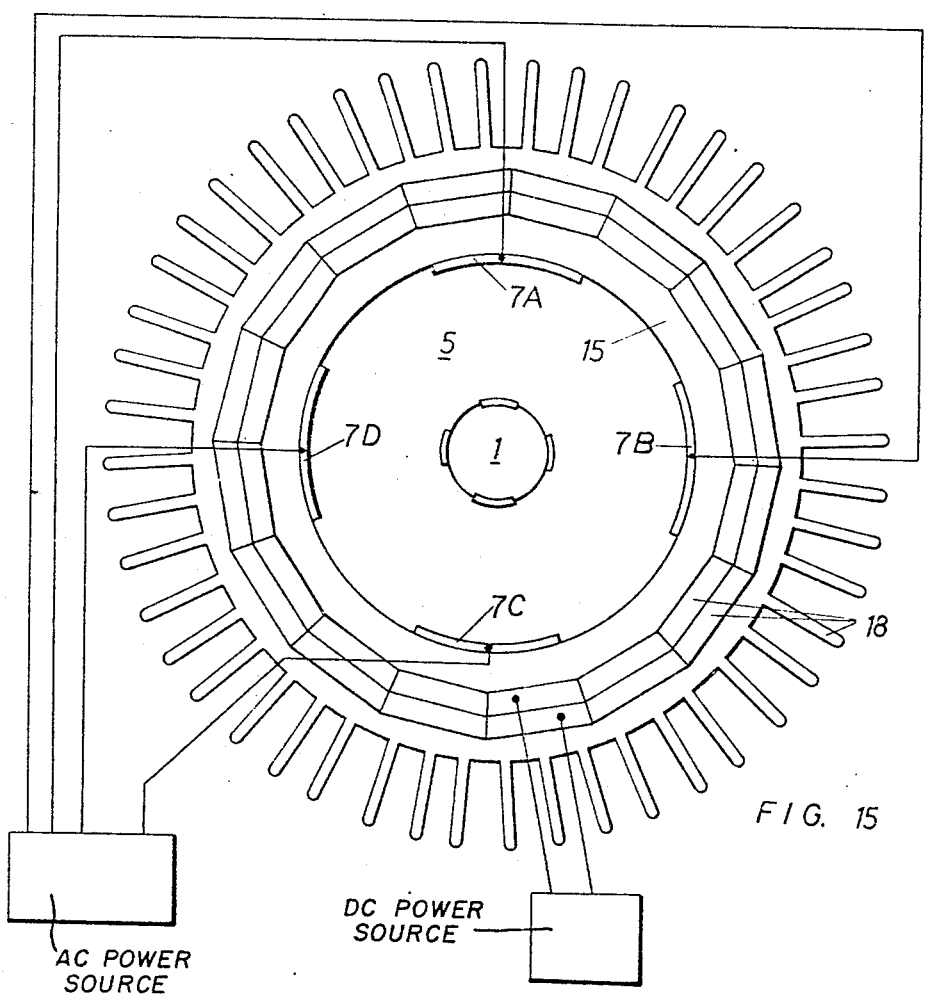
FIG. 15 is a schematic diagram of the piezoelectric unitary device of the present invention enclosed in a rigid housing comprising the conductive and isolating parts of a Peltier cooling system.

In FIG. 15, a rigid housing 18 which comprises a Peltier cooling system encloses the piezo driving body 5. Although the cooling system of FIG. 15 is thermally not as efficient as the cooling system of FIG. 10, it is more simple and practical than the cooling system of FIG. 10, since the system of FIG. 15 requires no cooling agent, gas or liquid, but only an electrical source of direct current to which the Peltier elements 18 are connected. In the arrangement of FIG. 15, the outer electrode 7A, 7B, 7C and 7D of the piezo driving body 5 are electrically insulated from the Peltier elements 18 to avoid a short-circuit between said piezo driving body and said Peltier elements.

Figure 16:
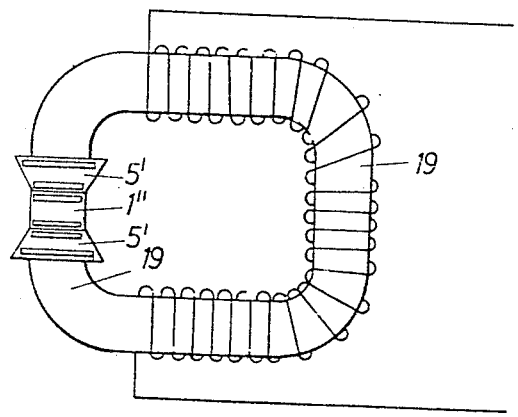
FIG. 16 is a schematic diagram of the piezoelectric unitary device of the present invention utilized with a strong solenoid.

In FIG. 16, the piezoelectric unitary device of the invention, comprising the piezoelectric crystal 1", the piezo driving body 5' and the other aforementioned components, is utilized with a strong solenoid 19. As is usual in maser systems, the unitary device of the invention is positioned in the strongest magnetic field produced by the solenoid 19. The piezoelectric force applied to the piezoelectric crystal 1" by the opposite piezo-electric effect is added to the electromagnetic force produced by the solenoid 19. The solenoid 19 is electrically connected to the same or other electrical source of alternating current as or than that (not shown in FIG. 16) supplying the alternating current for the piezoelectric unitary device.

Figure 17:
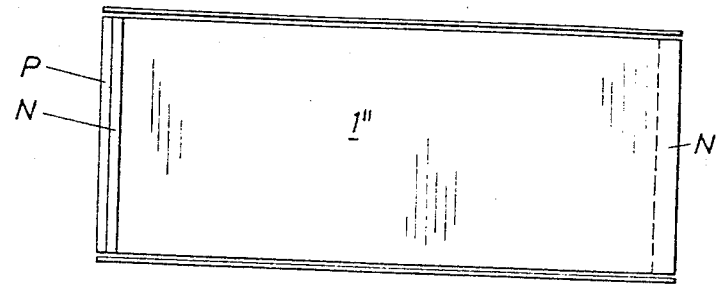
FIG. 17 is a schematic diagram illustrating the growing on the piezoelectric crystal of the present invention of layers of a pn junction or acceptors and donors.

FIG. 17 illustrates the growing on the piezoelectric crystal 1" of layers of a pn junction. The growth is accomplished by varying the solution in such a manner that a pn junction comprising spaced or adjacent layers of acceptors and donors is developed in the piezoelectric crystal 1″. The pn junction may serve for special optical purposes, such as, for example, the regulation of an amplification of structural light by an electronic regulating process.

Figure 18:
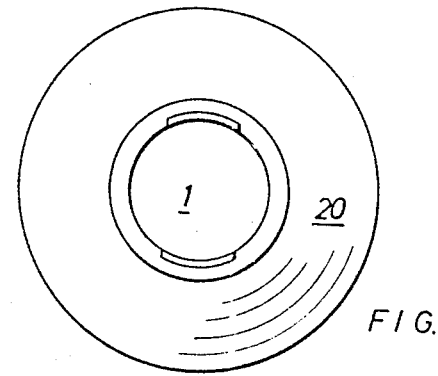
FIG. 18 is a front view of the piezoelectric crystal of the present invention in a rigid stationary tube.

In FIG. 18, the piezo driving body 5 is replaced solely by a rigid stationary tube 20 comprising, for example, Invar steel. The tube 20 fulfills the function of the piezo driving body 5 in a simple manner by preventing the dilation of the crystal 1.

FIG. 19 is a circuit diagram showing the connection of the electrodes 6A, 6B, 6C, 6D and 7A, 7B, 7C, 7D of the piezo driving body 5 and the electrodes 3A and 3B of the piezoelectric crystal 1 to a high frequency alternating current generator 22. The crystal axes of the piezo driving body 5 and of the piezoelectric crystal 1 are in identical orientation in the piezoelectric unitary device of the present invention.

FIG. 20 is a circuit diagram for the piezoelectric unitary device of the invention in which the crystal axes are directed against each other. A single set of common electrodes 21A, 21B, 21C and 21D is provided between the outer surface of the piezoelectric crystal 1 and the inner surface of the piezo driving body 5, without insulation between said crystal and said body. An electronic adjustor 23 is connected in the circuit between the high frequency alternating current source 22 and the piezoelectric unitary device of the invention. The adjustor 23 may comprise any suitable adjusting circuit, such as, for example, potentiometer means, for automatically adjusting the two electric fields to a relation in which the radiation or other efficiency of the unitary device is a maximum.

The efficiency of the piezoelectric unitary device of the present invention as an opposite piezoelectrically stimulated emitter of fluorescence is not yet known to its upper limit, since only a relatively limited number of efficiency tests could be made, due to the fact that only Rochelle salt and ammoniumdihydrogenphosphate crystals doped with neodymium or chorium have been available. It is thought, however, that the efficiency of the piezoelectric unitary device of the present invention is much higher than that of any other known normal direct and converse piezoelectric effect, with a conversion factor of not more than 20 to 40 percent. In accordance with quantum mechanical calculations, the efficiency is much higher, primarily due to the fact that, as hereinbefore described, in the present invention, for the first time in a piezoelectric device, the electric field applied to or produced by a piezoelectric crystal is not superimposed by an opposite directed electric field produced by the dipoles in the crystal lattice thereby attenuating said electric field considerably, but, on the contrary, adds to and strengthens said electric field. Therefore, the electric field energy supplied to or in the crystal of the present invention is no longer reduced almost to extinction by the aforedescribed superimposition and there is therefore no longer any loss of the intended purpose. Only further efficiency tests will disclose definitely that a solid-bodied light source must necessarily be by far superior to a light source filled with inactive gas, such as, for example, a common light bulb or lamp. A common lamp has the disadvantages of great possibility of breaking, wearing out and, above all, an efficiency of only about 10 percent. The other 90 percent of the energy of a lamp is lost in unwanted heat. Most of these disadvantages, such as, for example, possible breaking and required space are also disadvantages of fluorescent type lighting fixtures filled with rarefied gas.

With regard to the application of the piezoelectric unitary device of the present invention to the amplification of structural light, that is, photographic light images as widely used in optics, said device, for the first time, provides a way to bring enough electrical energy into a solid crystal body without destroying the structural light to be amplified, as when a crystal is optically pumped.

Heretofore, it was possible only by atomic processes to attain the effect of bringing electrons, already excited by impinging light raliation to a still higher energy level from which, in falling back, they produce new radiation of higher frequency thereby contradicting the so called rule of Stroke.

In order to provide amplification, the piezoelectric crystal 1 must be doped by heterogeneous ions of neodymium, chromium and the like. However, as hereinbefore described, only a layer or, in an optical lens system as used for photographic purposes, only one part of the system is doped. For the first time, theoretically, at least, the present invention offers a process of photographing, with infrared light, for example, modulating the light as it passes the piezoelectric crystal of the lens system to a higher frequency, and exposing a normal Panographic film with the modulated light, instead of a special film for infrared only. In the same manner, it is at least theoretically possible to provide a system for exposing a color film with light always at the same frequency of light, which is a type of frequency-stabilized color photography, merely by adjusting the amount of energy supplied to the piezoelectric crystal as part of the lens system and regulating said energy by a color light meter to be exactly the amount of electrical energy required to continuously modulate the light in the optical lens system to the same frequency and amount required for a perfect exposure. Such a system would eliminate many of the problems still existing in color photography, such as, for example, that of copying the prints manually with the help of so called Wratten color filters selected by the photographic laboratory technician.

Oscillating piezoelectric crystals called EOLM or Electro Optical Light Modulators, on the other hand, are being used to modulate the intensity of coherent laser light. This presents a field of future application for the piezoelectric unitary device of the present invention. The piezoelectric crystal 1 need not necessarily be doped for such applications.

The operation of a piezoelectric crystal 1 as a laser crystal itself depends only upon whether sufficient electrical energy can be supplied to said crystal to reach the so called inversion level, since only at such level is there a laser effect. There is a greater population of the higher energy levels with excited electrons at the inversion level than there are unexcited electrons at the so called ground level. According to quantum mechanical calculations, there is no reason why the device of the present invention should not achieve this if it is developed to greater perfection and thereby greater efficiency.

While only specific preferred features of the present invention have been described and illustrated, many modifications and variations will occur to those skilled in the art. It is, therefore, to be understood that the appended claims are intended to cover all such modifications and variations which fall within the true spirit and scope of this invention.

What I claim as new and desire to secure by Letters Patent of the Unted States is:

1. A piezoelectric unitary device for emitting fluorescence and amplifying radiation, comprising
   a transparent piezoelectric crystal having a piezo axis and being doped with ions of atoms heterogeneous to those of the crystal lattice;
   a piezo driving body adjacent and forming a single unitary device with said crystal, said piezo driving body being mechanically coupled to said crystal and applying mechanical pressure to said crystal to provide a direct piezoelectric effect in said crystal;
   a source of alternating current; and
   circuit means electrically connecting said source of alternating current to said crystal and to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal.

2. A piezoelectric unitary device for emitting fluorescence and amplifying radiation, comprising
- a transparent piezoelectric crystal having a crystal axis, a piezo axis and a surface and being doped with ions heterogeneous to those of the crystal lattice;
- a piezo driving body comprising piezoelectric material and forming a single unitary device with said crystal, said piezo driving body being mechanically coupled to said crystal at an abutting surface of said crystal and an abutting surface of said piezo driving body and applying mechanical pressure to said crystal to provide a direct piezoelectric effect in said crystal;
- common electrode means provided in electrical contact with the abutting surfaces of said crystal and said piezo driving body;
- a source of alternating current; and
- circuit means electrically connecting said source of alternating current to the common electrode means of said crystal and said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal.

3. A piezoelectric unitary device for emitting fluorescence and amplifying radiation, comprising
- a transparent piezoelectric crystal having a piezo axis and being doped with ions of atoms heterogeneous to those of the crystal lattice;
- a piezo driving body comprising piezoelectric material and forming a single unitary device with said crystal, said piezo driving body being mechanically coupled to said crystal and applying mechanical pressure to said crystal to provide a direct piezoelectric effect in said crystal;
- a rigid housing tightly enclosing said piezo driving body, said housing comprising a Peltier cooling system;
- electrical insulating material interposed between said piezo driving body and said housing;
- a source of direct current electrically connected to said Peltier cooling system;
- electrode means provided in electrical contact with said crystal;
- electrode means provided in electrical contact with said piezo driving body;
- a source of alternating current; and
- circuit means electrically connecting said source of alternating current to the electrode means of said crystal and said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in the crystal.

4. A piezoelectric unitary device as claimed in claim 1, wherein said piezo driving body comprises a piezoelectric crystal of single crystal structure having a surface having electrode means provided in electrical contact therewith, said transparent crystal has an outer surface having electrode means provided in electrical contact, and said transparent crystal is tightly seated in said piezo driving body, and further comprising electrical insulating material interposed between the outer surface of said transparent crystal and the inner surface of said piezo driving body.

5. A piezoelectric unitary device as claimed in claim 1, wherein said piezo driving body comprises piezo ceramic material, said transparent crystal has an outer surface having electrode means provided in electrical contact therewith, said piezo driving body has an inner surface having electrode means provided in electrical contact therewith and extending into said driving body, the electrode means of said piezo driving body being embedded in said piezo ceramic material in substantially radially extending separate main portions each of which having a plurality of arcuate substantially parallel minor portions branching therefrom in substantially concentric configuration, and said transparent crystal is tightly seated in said piezo driving body, and further comprising electrical insulating material interposed between the outer surface of said transparent crystal and the inner surface of said piezo driving body.

6. A piezoelectric unitary device as claimed in claim 1, further comprising a rigid housing tightly surrounding said piezo driving body and electrical insulating material interposed between said driving body and said housing.

7. A method of producing a piezoelectric unitary device for emitting fluorescence and amplifying radiation, comprising the steps of
- doping a transparent piezoelectric crystal having a piezo axis with ions of atoms heterogeneous to those of the crystal lattice;
- mechanically coupling a piezo driving body having a piezo axis to said crystal and forming a single unitary device of said crystal and said driving body for applying mechanical pressure to said crystal to provide a direct piezoelectric effect;
- orienting the piezo axis of the piezo driving body relative to that of the crystal to provide a converse piezoelectric effect with the direct piezoelectric effect and the converse piezoelectric effect opposed to and working against each other in the crystal; and
- applying alternating current to the crystal and to the piezo driving body.

8. A method as claimed in claim 7, wherein the crystal is artificially grown and the donor ions are supplied to the crystal lattice while it is being grown.

9. A method as claimed in claim 7, wherein the crystal and the piezo driving body are formed as a unitary device during the growing of one of said crystal and said driving body, and further comprising providing electrodes in electrical contact with a surface of one of said crystal and said driving body and growing the other of said crystal and said driving body as a unit with the one thereof.

10. A method as claimed in claim 7, further comprising optically grinding the crystal and including the unitary device as a component of an optical lens system.

11. A method as claimed in claim 8, wherein the crystal is doped in different parallel layers forming a pn junction and comprising layers of acceptors and donors.

12. A method as claimed in claim 9, wherein the crystal is grown in the piezo driving body, and further comprising coating said driving body with insoluble material to prevent its dissolving in solution.

13. A piezoelectric unitary device for emitting fluorescence and amplifying radiation, comprising
- a transparent piezoelectric crystal having a piezo axis and being doped with ions of atoms heterogeneous to those of the crystal lattice, said crystal being doped with ions of neodymium, chromium and the like;
- a piezo driving body adjacent and forming a single unitary device with said crystal, said piezo driving body being mechanically coupled to said crystal and applying mechanical pressure to said crystal to provide a direct piezoelectric effect in said crystal;
- a source of alternating current; and
- circuit means electrically connecting said source of alternating current to said crystal and to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal.

14. A piezoelectric unitary device for emitting fluorescence and ampifying radiation, comprising
  a transparent piezoelectric crystal having a piezo axis and being doped with ions of atoms heterogeneous to those of the crystal lattice;
  a piezo driving body adjacent and forming a single unitary device with said crystal, said piezo driving body being mechanically coupled to said crystal and applying mechanical pressure to said crystal to provide a direct piezoelectric effect in said crystal, said piezo driving body comprising a magnetostrictive transducer of annular configuration and said crystal being seated in said driving body whereby pressure produced by vibration of said driving body is in directions of the longitudinal axis of said driving body;
  a source of alternating current; and
  circuit means electrically connecting said source of alternating current to said crystal and to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal.

15. A piezoelectric unitary device for emitting fluorescence and amplifying radiation, comprising
  a transparent piezoelectric crystal having a piezo axis and being doped with ions of atoms heterogeneous to those of the crystal lattice, said crystal being of annular configuration having an inner surface and a thickness corresponding to the thickness of said crystal at resonance in accordance with the frequency of said alternating current, said circuit means including electrode means provided in electrical contact with the inner surface of said crystal;
  a piezo driving body adjacent and forming a single unitary device with said crystal, said piezo driving body being mechanically coupled to said crystal and applying mechanical pressure to said crystal to provide a direct piezoelectric effect said piezo driving body having a piezo axis having an orientation in said crystal;
  a source of alternating current; and
  circuit means electrically connecting said source of alternating current to said crystal and to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal.

16. A piezoelectric unitary device for emitting fluorescence and amplifying radiation, comprising
  a transparent piezoelectric crystal having a piezo axis and being doped with ions of atoms heterogeneous to those of the crystal lattice;
  a piezo driving body adjacent and forming a single unitary device with said crystal, said piezo driving body being mechanically coupled to said crystal and applying mechanical pressure to said crystal to provide a direct piezoelectric effect in said crystal, each of said crystal and said piezo driving body comprising more than one component part and said crystal and driving body having the configurations of ultrasonic transducers, said driving body being structurally stronger than said crystal;
  a source of alternating current; and
  circuit means electrically connecting said source of alternating current to said crystal and to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal.

17. A piezoelectric unitary device for emitting fluorescence and amplifying radiation, comprising
  a transparent piezoelectric crystal having a piezo axis and being doped with ions of atoms heterogeneous to those of the crystal lattice, said crystal being of rod-like configuration having parallel planar ends coated with reflective material thereby forming an optical resonator;
  a piezo driving body adjacent and forming a single unitary device with said crystal, said piezo driving body being mechanically coupled to said crystal and applying mechanical pressure to said crystal to provide a direct piezoelectric effect in said crystal;
  a source of alternating current; and
  circuit means electrically connecting said source of alternating current to said crystal and to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal.

18. A piezoelectric unitary device as claimed in claim 17, wherein said reflective material comprises a thin layer of silver.

19. A piezoelectric unitary device for emitting fluorescence and amplifying radiation, comprising
  a tube having thin elastic walls of electrical insulating material including parts of electrical conductive material;
  a transparent piezoelectric crystal having a piezo axis and being doped with ions of atoms heterogeneous to those of the crystal lattice, said crystal being tightly seated in said tube with said tube extending beyond both ends of said crystal so that said unitary device is positionable in a cooling stream without affecting the free passage of electromagnetic radiation through said crystal;
  a piezo driving body adjacent and forming a single unitary device with said crystal, said piezo driving body being mechanically coupled to said crystal and applying mechanical pressure to said crystal to provide a direct piezoelectric effect in said crystal, said piezo driving body being seated on said tube in a manner whereby said tube responds to pressure applied by said driving body;
  a source of alternating current; and
  circuit means electrically connecting said source of alternating current to said crystal and to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal.

20. A piezoelectric unitary device for emitting fluorescence and amplifying radiation, comprising
   a transparent piezoelectric crystal having a piezo axis and being doped with ions of atoms heterogeneous to those of the crystal lattice;
   a piezo driving body adjacent and forming a single unitary device with said crystal, said piezo driving body being mechanically coupled to said crystal and applying mechanical pressure to said crystal to provide a direct piezoelectric effect in said crystal;
   a source of alternating current;
   circuit means electrically connecting said source of alternating current to said crystal and to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal; and
   a solenoid operating at a frequency having a simple relation to the frequency of said alternating current, said unitary device being positioned in the strongest magnetic field produced by said solenoid.

21. A piezoelectric unitary device for emitting fluorescence and amplifying radiation, comprising
   a transparent piezoelectric crystal having a piezo axis and being doped with ions of atoms heterogeneous to those of the crystal lattice;
   a piezo driving body adjacent and forming a single unitary device with said crystal, said piezo driving body being mechanically coupled to said crystal and applying mechanical pressure to said crystal to provide a direct piezoelectric effect said piezo driving body having a piezo axis having an orientation in said crystal;
   a source of alternating current comprising a high voltage high frequency generator operating at a frequency in the range $0.5 \times 10^6$ Hertz to $1.0 \times 10^{12}$ Hertz; and
   circuit means electrically connecting said source of alternating current to said crystal and to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal.

22. A piezoelectric unitary device for emitting fluorescence and amplifying radiation, comprising
   a transparent piezoelectric crystal having a piezo axis and being doped with ions of atoms heterogeneous to those of the crystal lattice;
   a piezo driving body adjacent and forming a single unitary device with said crystal, said piezo driving body being mechanically coupled to said crystal and applying mechanical pressure to said crystal to provide a direct piezoelectric effect in said crystal;
   a source of alternating current; and
   circuit means electrically connecting said source of alternating current to said crystal and to said piezo driving body, the phases of the electrical fields applied to said crystal and said piezo driving body via said circuit means being displaced from each other, the electrical field applied to said crystal having positive and negative peaks at less than a half wavelength phase difference from those of the electrical field applied to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal.

23. A piezoelectric unitary device for emitting fluorescence and amplifying radiation, comprising
   a transparent piezoelectric crystal having a piezo axis and being doped with ions of atoms heterogeneous to those of the crystal lattice;
   a piezo driving body adjacent and forming a single unitary device with said crystal, said piezo driving body being mechanically coupled to said crystal and applying mechanical pressure to said crystal to provide a direct piezoelectric effect in said crystal, said piezo driving body comprising a rigid inflexible tube and said crystal being tightly seated in said tube whereby said tube prevents dilation of said crystal;
   a source of alternating current; and
   circuit means electrically connecting said source of alternating current to said crystal and to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal.

24. A piezoelectric unitary device for emitting fluorescence and amplifying radiation, comprising
   a transparent piezoelectric crystal having a piezo axis and being doped with ions of atoms heterogeneous to those of the crystal lattice, said crystal having an outer surface having electrode means provided in electrical contact therewith;
   a piezo driving body adjacent and forming a single unitary device with said crystal, said piezo driving body being mechanically coupled to said crystal and applying mechanical pressure to said crystal to provide a direct piezoelectric effect in said crystal, said piezo driving body comprising a piezoelectric crystal of single crystal structure having a surface having electrode means provided in electrical contact therewith, said transparent crystal being tightly seated in said piezo driving body, the electrode means of each of said transparent crystal and said piezo driving body comprising a thin film of silver;
   a source of alternating current;
   circuit means electrically connecting said source of alternating current to said crystal and to said piezo driving body thereby producing a converse piezoelectric effect in each of said crystal and said piezo driving body, the converse piezoelcetric effect in the piezo driving body producing the mechanical pressure applied to said crystal, and the direct piezoelectric effect and the converse piezoelectric effect being opposed to and working against each other in said crystal; and
   electrical insulating material comprising a thin elastic layer of dielectric material interposed between the outer surface of said transparent crystal and the inner surface of said piezo driving body.

25. A piezoelectric unitary device for emitting fluorescence and amplifying radiation, comprising
   a transparent piezoelectric crystal having a piezo axis and being doped with ions of atoms heterogeneous to those of the crystal lattice, said crystal having an outer surface having electrode means provided in electrical contact therewith;
   a piezo driving body adjacent and forming a single unitary device with said crystal, said piezo driving body being mechanically coupled to said crystal and applying mechanical pressure to said crystal to provide a direct piezoelectric effect in said crystal, said piezo driving body comprising piezo ceramic material comprising polarized barium titanate and having an inner surface having electrode means provided in electrical contact therewith and extending into said driving body, the electrode means of said piezo driving body being embedded in said piezo ceramic material in substantially radially extending separate main portions each of which having a plurality of arcuate substantially parallel minor portions branching therefrom in substantially concentric configuration, said transparent crystal being tightly seated in said piezo driving body, the electrode means of each of said transparent crystal and said piezo driving body comprising a thin film of silver;

a source of alternating current;

circuit means electrically connecting said source of alternating current to said crystal and to said piezo driving body thereby producing a converse piezoelectric effect in each of said crystal and said piezo driving body, the converse piezoelectric effect in the piezo driving body producing the mechanical pressure applied to said crystal, and the direct piezoelectric effect and the converse piezoelectric effect being opposed to and working against each other in said crystal; and electrical insulating material comprising a thin elastic layer of dielectric material interposed between the outer surface of said transparent crystal and the inner surface of said piezo driving body.

References Cited

UNITED STATES PATENTS

| | | | |
|---|---|---|---|
| 3,093,758 | 6/1963 | Hutson | 252—62.9 |
| 3,235,799 | 2/1966 | Hurvitz | 324—80 |
| 3,394,081 | 7/1968 | Ballman et al. | 252—62.9 |
| 2,936,416 | 5/1960 | Hurvitz | 250—71 X |
| 3,093,735 | 6/1963 | Blakewood et al. | 250—83 |
| 3,254,264 | 5/1966 | Ward | 250—71 X |

ARCHIE R. BORCHELT, Primary Examiner

U.S. Cl. X.R.

250—83; 252—62.9; 324—80